United States Patent

Drechsler

[15] 3,698,631

[45] Oct. 17, 1972

[54] APPARATUS FOR GENERATING A LOGARITHMICALLY RELATED SERIES OF DIGITALLY CODED SIGNAL QUANTITIES

[72] Inventor: Rudolph Charles Drechsler, Freehold, N.J.

[73] Assignee: Bell Telephone Laboratories, Incorporated, Murray Hill, N.J.

[22] Filed: Nov. 19, 1970

[21] Appl. No.: 91,113

[52] U.S. Cl. ...................235/152, 235/156, 235/197

[51] Int. Cl............................G06f 15/34, G06f 7/385

[58] Field of Search......235/152, 156, 164, 173, 175, 235/197

[56] References Cited

UNITED STATES PATENTS 3,495,075 2/1970 Leal et al...................235/175

3,426,184 2/1969 Riseman....................235/152

*Primary Examiner*—Eugene G. Botz

*Assistant Examiner*—James F. Gottman

*Attorney*—R. J. Guenther and William L. Keefauver

[57] ABSTRACT

By repeated application of the contents of an accumulator to an adder at both full and reduced numerical significance and reapplication of the output sum of the adder to the accumulator, the representative numerical signal stored in the accumulator is made to rise exponentially. This process is periodically interrupted to permit use of the logarithmically related digitally coded signal quantities stored in the accumulator to drive any digitally programmable utilization device.

14 Claims, 2 Drawing Figures

INVENTOR
R. C. DRECHSLER
BY Gerard E. Murphy
ATTORNEY

APPARATUS FOR GENERATING A LOGARITHMICALLY RELATED SERIES OF DIGITALLY CODED SIGNAL QUANTITIES

BACKGROUND OF THE INVENTION

1. Field of the Invention

This invention relates to sweep signal generators and, more particularly, to apparatus for generating a logarithmically related series of digitally coded signal quantities useful in sweeping such apparatus as a digitally programmable frequency synthesizer.

2. Description of the Prior Art

The precise measurement of transmission parameters such as gain and phase as a function of frequency is a prerequisite to the complete analysis of a communications system. Common procedure is to energize the system or network with signals from a variable frequency signal generator or synthesizer and record or otherwise display the response of the system as the input signal frequency is varied. Particularly desirable for applications of this kind are digitally programmable frequency synthesizers, i.e., those which generate a signal the frequency of which is determined by an applied signal representing a digitally coded quantity. Such frequency synthesizers are generally preferred for their stability and for the ease with which any series of applied signal quantities, and hence any series of signal frequencies, can be precisely duplicated.

In order to test a communications system in the foregoing manner it is frequently desirable to generate a logarithmically related series of signal frequencies starting with the lowest frequency of interest and ending with the highest. When a digitally programmable frequency synthesizer is being used, this is accomplished by applying a logarithmically related series of digitally coded signal quantities to the frequency synthesizer. Where the desired series comprises a large number of such frequencies or where the series must be repeated many times, the required digitally coded driving quantities can not be conveniently or efficiently originated from any manually operated apparatus. In addition, the response of the system to each test frequency can usually be determined in a relatively short period of time. An efficient testing operation therefore calls for the rapid generation of the digitally coded driving quantities.

It is therefore an object of this invention to provide apparatus for generating a logarithmically related series of digitally coded signal quantities for use in driving a digitally programmable frequency synthesizer or any other digitally programmable apparatus.

Since the uses to which apparatus such as this can be put are so varied, it is also desirable that the starting and ending quantities be readily variable. Not only are there many different types of communications systems which must be tested, but there are many other types of digitally programmable utilization devices which require alterable starting and ending quantities.

It is therefore another object of this invention to provide apparatus for generating a logarithmically related series of digitally coded signal quantities whose starting and ending quantities can be easily altered.

SUMMARY OF THE INVENTION

These and other objects are accomplished, in accordance with the principles of this invention, by repeated application of the contents of an accumulator to an adder at both full and reduced numerical significance and reapplication of the output sum of the adder to the accumulator. More particularly, in response to each of a predetermined number of pulses from a source of high frequency timing pulses, a digitally coded quantity stored in an accumulator or storage register is applied to an adder at full and reduced numerical significance and the sum applied to the storage register to replace the quantity on which the sum was based. After each such series of high frequency clock pulses, the resulting exponential rise in the contents of the storage register is temporarily halted while the quantity in the storage register is applied to any digitally programmable utilization device, e.g., a digitally programmable frequency synthesizer. Thereafter, a pulse from a low frequency clock permits another series of high frequency timing pulses to enable the arithmetic units of the apparatus (i.e., the storage register and the adder), thereby producing a further exponential rise in the contents of the storage register. This process continues until the contents of the storage register reach a predetermined maximum value, at which time further low frequency clock pulses are inhibited.

Further features and objects of this invention, its nature, and various advantages, will be more apparent upon consideration of the attached drawing and the following detailed description of the invention.

DETAILED DESCRIPTION OF THE INVENTION

Figure 1:
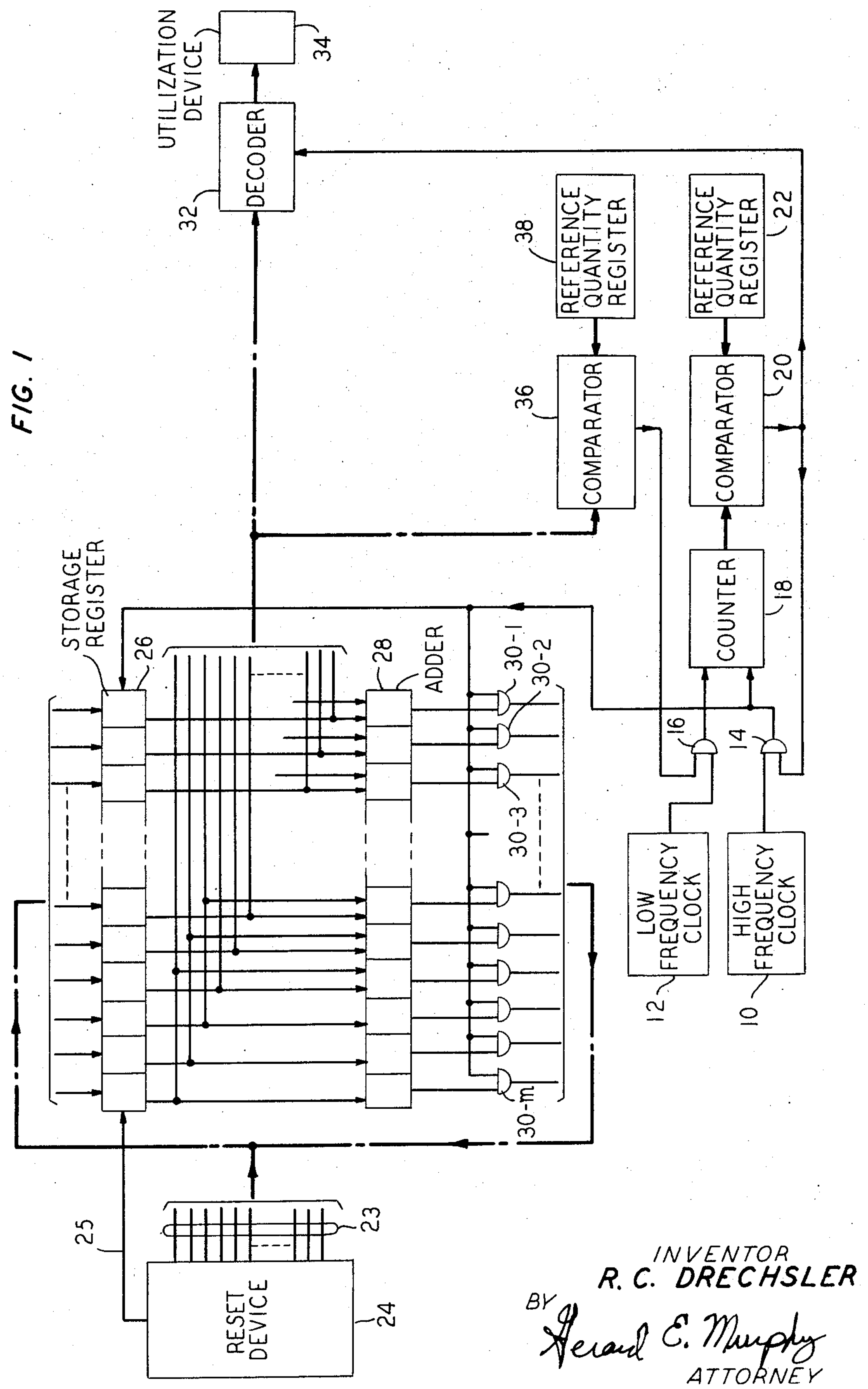
FIG. 1 is a schematic diagram of the apparatus of this invention.

As shown in FIG. 1, signals representative of a digitally coded arithmetic quantity $f_0$ are applied by reset device 24 to the several components or numerical places of storage register 26 in order to initiate operation of the apparatus. For this purpose, reset device 24 is connected to register 26 by leads 23. Quantity $f_0$ is a number which when stored in storage register 26 can be decoded (if decoding is necessary) by decoder 32 and applied to utilization device 34 to produce a desired initial condition in device 34. Register 26 may, therefore, be any suitable digital accumulator or storage register, preferably of the type which changes state (i.e., output signal conditions) to reflect applied signal conditions in response to a separately applied enabling control pulse. Where binary coding is employed for the stored quantity, register 26 may be a plurality of bistable multivibrator of flip-flop devices, one for each binary place of the quantity to be stored. Reset device 24 may be any, preferably adjustable, source of digital signals (e.g., a plurality of switches or a core memory) which can be momentarily activated in response to manual or other control apparatus (not shown) at the start of the operation of the apparatus and then deactivated or disconnected after the quantity $f_0$ has been stored in register 26. Reset device 24 must also include means for separately applying an enabling pulse to register 26 by way of lead 25 in order to enable register 26 to accept and store the initial quantity $f_0$. Decoder 32, which, as has been mentioned, may be required to convert quantities stored in register 26 to a form suitable for application to utilization device 34 (e.g., from binary coding to decimal coding), may be any suitable logic circuitry. As has also been mentioned, utilization device 34 may be any apparatus to which a logarithmically related series of digitally coded signal quantities is to be applied, for example, a digitally programmable frequency synthesizer.

When the initial quantity $f_0$ has been stored in register 26, high and low frequency clocks 10 and 12 may be started by manual or other control apparatus (not shown). Each of these devices produces a series of timing pulses at regularly spaced intervals, $T_1$ and $T_2$, respectively, there being several high frequency pulses for each low frequency pulse. Clocks 10 and 12 may therefore be any suitable timing signal generators.

Pulses from high frequency clock 10 are applied at intervals of time $T_1$ to AND gate 14. Counter 18 counts the high frequency clock pulses passed by AND gate 14 and applies signals representative of that count to comparator 20. Comparator 20 compares the quantity in counter 18 with an integer reference quantity $n$, stored in reference quantity storage register 22, and applies a gate enabling signal to AND gate 14 as long as the quantity in counter 18 is less than or equal to the reference quantity $n$. As will be discussed, counter 18 is reset to a count of zero by any pulse from low frequency clock 12, applied by way of AND gate 16. Counter 18 may, therefore, be any resettable electronic integer counter, register 22 may be any, preferably adjustable, apparatus for storing an integer quantity, and comparator 20 may be any logic circuitry capable of determining whether or not one applied integer quantity is larger than another.

All high frequency clock pulses passed by AND gate 14 are also applied as enabling control pulses to storage register 26 and as gate enabling pulses to AND gates 30–1 through 30–m. As long as the reference quantity $n$ is less than the ratio of $T_2$ to $T_1$, AND gate 14 passes high frequency clock pulses in groups of $n$. Thus, assuming counter 18 to initially contain the quantity zero, AND gate 14 passes high frequency clock pulses until $n$ have been passed. At that time comparator 20 disables gate 14, thereby blocking further high frequency clock pulses until, at some later time, counter 18 is reset by a pulse from low frequency clock 12. Comparator 20 then again enables AND gate 14 and another group of $n$ high frequency clock pulses is passed. This process continues until AND gate 16 is disabled as discussed below, thereby preventing application of further low frequency clock pulses to counter 18.

The quantity stored in storage register 26 is applied to adder 28 in two forms. In the first of these forms, signals representative of each numerical place of the stored quantity are applied to adder 28 without change in numerical significance. In the second form, signals representative of each numerical place of the stored quantity are applied to the adder with numerical significance reduced by a predetermined negative integer power of the base or radix of the stored quantity. This reduction in numerical significance is equivalent to multiplying the stored quantity by a numerical factor less than one, in particular, by a factor given by the above-mentioned negative integer power of the base or radix.

The quantity stored in register 26 may be applied to adder 28 in the two required forms in any of several ways. Where, as shown in FIG. 1, adder 28 is arranged to form the sum of two simultaneously applied parallel quantities, the two required forms can be realized by the manner in which the numerical places of storage register 26 are connected to the places of adder 28. The output terminal for each numerical place of storage register 26 is connected directly to one input terminal of the component of adder 28 having corresponding numerical significance. Each of the output terminals for the most significant places of storage register 26 are also connected to the second input terminals of an adder component having a numerical significance less, by a predetermined number of places (i.e., powers of the radix), than the significance of the corresponding storage register component. These latter connections produce the reduction in numerical significance of the stored quantity required for application of that quantity to adder 28 in the above-mentioned second form. Alternatively, by replacing parallel storage register 26 and parallel adder 28 with a shift register and a serial adder, respectively, serial arithmetic could be used to form the required sum. In that event it would be possible to take advantage of the fact that a time delay of one serial quantity relative to another is equivalent to shifting one parallel quantity with respect to another to produce a reduction in numerical significance. Accordingly, a digital delay line could be used as the equivalent of the shifting connections between storage register 26 and adder 28.

Because both register 26 and adder 28 are of finite size, not all of the places in register 26 can be connected to lower order adder places. Thus, several of the lower order components of register 26 are connected only to directly corresponding adder components. This reflects a necessary truncation of the stored quantity as applied to adder 28 in the second, shifted, or reduced form. Similarly, several of the higher order components of adder 28 have only one connection to register 26. Nevertheless, register 26 and adder 28 may have a sufficient number of arithmetic places to render the error caused by this truncation negligible.

Each time AND gates 30 are enabled by a high frequency clock pulse passed by AND gate 14, output signals from adder 28 are applied by way of those gates to the input terminals of register 26. Register 26, being simultaneously enabled by an applied high frequency clock pulse, changes state to reflect the quantity represented by the signals produced by adder 28. Repeated addition of the quantity stored in register 26 at full and reduced significance and the replacement of the stored quantity with the resulting sum produces an approximately exponential rise in the stored quantity.

As an example of the foregoing, consider a system in which binary coding is employed for the quantity stored in register 26. Disregarding truncation error, each binary coded output quantity $f_i$ produced by adder 28 and stored in register 26 will be the sum of the preceding stored quantity $f_{i-1}$ at full numerical significance and at numerical significance reduced by $q$ powers of the binary radix 2, where $q$ is the number of binary places the latter quantity is shifted relative to the former as applied to adder 28. Expressed mathematically, $$f_i=f_{i-1}(1+2^{-q}). \qquad (1)$$

By induction, any quantity $f_i$ stored in storage register 26 can be related to the initial quantity $f_o$ by the expression $$f_i=f_o(1+2^{-q})^i \qquad (2)$$

where $i$ is the number of times the stored quantity has been cycled through adder 28 (i.e., the number of high frequency clock pulses that have been passed by AND gate 14). Relation (2) is readily identified as a geometric progression with ratio $1+2^{-q}$. As is true of all geometric progressions, however, relation (2) is also an expression for an logarithmically related series of numbers having any convenient base (e.g., 10 or $e$). This can be readily shown as follows. For any arbitrary base quantity $b$, the following relationship can be written:

$$1+2^{-q}=b^k \qquad (3)$$

where $k$ is some constant quantity. Relation (2) can then be rewritten using relation (3) as follows:

$$f_i=f_ob^{ki}. \qquad (4)$$

Taking the logarithm to the base $b$ of both sides of relation (4) yields $$\log_b f_i=\log_b f_o+ki. \qquad (5)$$

Thus were $f_i$ to be plotted on a logarithmic scale (base $b$) versus $i$ on a linear scale, a straight line would result. The same would be true using any other logarithmic scale. Accordingly, the $f_i$ are a logarithmically related series of quantities. By the same token, relation (4) makes it clear that $f_i$ rises exponentially as $i$ increases, since the independent variable $i$ appears in the exponent of that expression for $f_i$.

Figure 2:
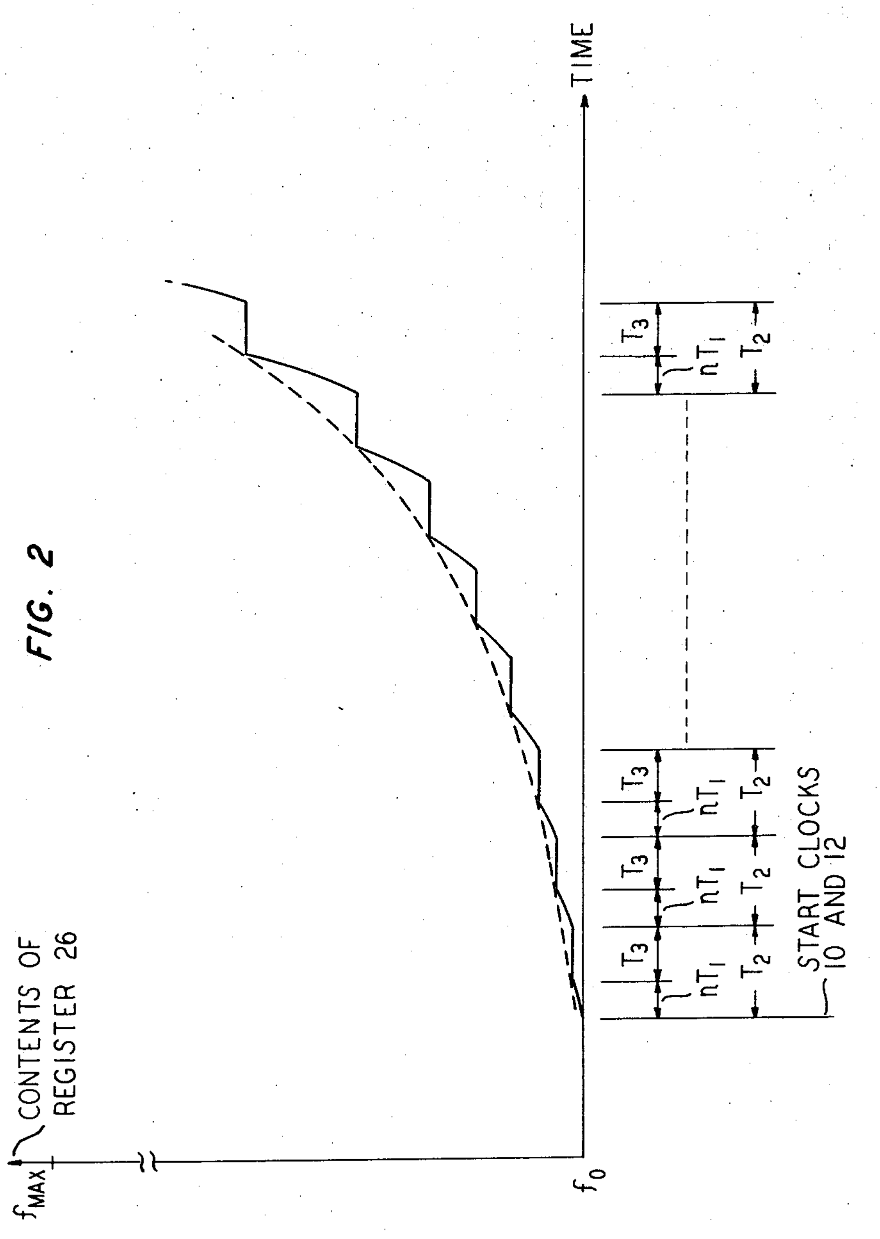
FIG. 2 illustrates the manner in which the digitally coded quantity stored in the storage register of the apparatus of FIG. 1 is made to increase.

As shown by the solid line in FIG. 2 which represents a trace of the contents of register 26, there is an exponential rise in the contents of that device while high frequency clock pulses with period $T_1$ are being applied to register 26 and gates 30, i.e., during time intervals denoted $nT_1$ in FIG. 2. Although these segments of the curve of FIG. 2 are shown as smooth or continuous, it will be understood that each such segment is in fact made up of $n$ discrete steps. Since $N$ is assumed to be less than the ratio of $T_2$ to $T_1$, $nT_1$ is less than $T_2$. Accordingly, after each group of $n$ high frequency clock pulses is passed by AND gate 14, there is an interval of time $T_3$ given by $$T_3=T_2-nT_1 \qquad (6)$$

during which no pulses are passed by AND gate 14 or applied to storage register 26 or to AND gates 30. During each such interval, the quantity stored in register 26 does not increase. Each such temporarily stable stored quantity is decoded by decoder 32 and the decoded signal applied to utilization device 34. As shown in FIG. 1, decoder 32 can be made responsive to signals produced by comparator 20 so that it operates only while the stored quantity is fixed, i.e., while AND gate 14 is disabled. This condition continues for an interval of time $T_3$. After each such interval, a pulse from low frequency clock 12 resets counter 18, thus allowing another series of $n$ high frequency clock pulses to be passed by gate 14 and applied to counter 18, register 26, and gates 30. The result is a further exponential increase in the quantity stored in register 26. This process continues until terminated as discussed below.

In addition to being applied to decoder 32, the signals produced by storage register 26 are also applied to comparator 36. Comparator 36, which may be similar to comparator 20, compares the quantity represented by the signals produced by storage register 26 with the reference quantity $f_{max}$ stored in reference quantity storage register 38, similar to storage register 22. Comparator 36 applies a gate enabling signal to AND gate 16 until the decoded quantity exceeds $f_{max}$ at which time AND gate 16 is disabled. Once AND gate 16 has been disabled, counter 18 can not again be reset. Accordingly, after the current group of $n$ high frequency clock pulses is completed, operation of the apparatus is halted.

Since the quantities stored in register 26 during the time intervals $T_3$ (i.e., the quantities at the plateaus on the solid curve in FIG. 2) represent regularly spaced interruptions of an otherwise exponential process, the quantities stored in register 26 during these time intervals are a logarithmically related series of digital quantities. This is illustrated by the exponential rise in the broken line in FIG. 2 which traces an "envelope" of the quantities stored in register 26 during intervals $T_3$. When applied to utilization device 34, these quantities constitute the desired series of logarithmically related driving quantities. If, for example, utilization device 34 is a digitally programmable frequency synthesizer, it will generate a series of signals having logarithmically related frequencies. Each signal frequency will be generated for an identical interval of time $T_3$ and will be framed in time by intervals of time $nT_1$ during which no signal is generated. Such a series of signal frequencies is exceedingly useful in testing the transmission characteristics of communications equipment and for similar purposes. As will be readily apparent, the starting and ending quantities, $f_o$ and $f_{max}$, respectively, can be easily changed to suit the requirements of any particular application of the apparatus of this invention. This will be particularly easy to accomplish if reset device 24 and reference quantity storage register 38 are made adjustable in this respect. Likewise, the overall rate at which the quantity in storage register 26 increases can be altered by changing the reference quantity $n$. A smaller value of $n$ will increase the time required for the stored quantity to increase from any given $f_o$ to any given $f_{max}$, with the result that there will be more quantities applied to utilization device 34. Conversely, a larger value of $n$ will decrease the number of quantities applied to utilization device in going between given values of $f_o$ and $f_{max}$. Again this change in the operating characteristics of the apparatus can be most easily made if reference quantity storage register 22 is made adjustable with respect to the quantity stored therein. Even greater changes can be made in the operating characteristics of the apparatus by changing the characteristic frequencies of one or both of clocks 10 and 12.

It is to be understood that the embodiments shown and described herein are illustrative of the principles of this invention only and that modifications may be implemented by those skilled in the art without departing from the spirit and scope of the invention. For example, in the event that an uninterrupted series of logarithmically related digitally coded signal quantities is required for application to a utilization device, the recycling of the quantity stored in register 26 through adder 28 can be allowed to continue without the periodic interruptions discussed above. This can be accomplished simply by making the stored quantity $n$ greater than or equal to the ratio of $T_2$ to $T_1$.

What is claimed is:

1. Apparatus for generating a logarithmically related series of digitally coded signal quantities comprising:
   - an accumulator for storing a digitally coded numerical quantity;
   - an adder for producing output signals representative of the sum of two digitally coded signal quantities applied thereto;
   - means for applying said stored digitally coded signal quantity to said adder;
   - means for applying a predetermined constant fraction of said stored digitally coded signal quantity to said adder; and
   - means for applying said output signals of said adder to said accumulator.

2. The method of generating a logarithmically related series of digitally coded signal quantities comprising the steps of:
   - storing a digitally coded numerical quantity in an accumulator;
   - adding said stored digitally coded signal quantity and a predetermined constant fraction of said stored digitally coded signal quantity; and
   - applying the sum of said stored quantity and said predetermined constant fraction of said stored quantity to said accumulator.

3. Apparatus for generating a logarithmically related series of digitally coded signal quantities comprising:
   - means for generating a series of control pulses;
   - a storage register for storing an applied digitally coded signal quantity in response to each of said control pulses and for producing a digitally coded output signal representative of said stored signal quantity;
   - an adder for producing a digitally coded output signal representative of the sum of two digitally coded signal quantities applied thereto;
   - first means for applying said stored digitally coded signal quantity to said adder;
   - second means for applying said stored digitally coded signal quantity to said adder with numerical significance reduced relative to the numerical significance of said digitally coded signal quantity as applied to said adder by said first means; and
   - means for supplying said adder output signal to said storage register.

4. The apparatus of claim 3 wherein said means for generating a series of control pulses further comprises:
   - first source of timing pulses; and
   - means for periodically enabling said first source of timing pulses.

5. The apparatus of claim 4 wherein said first source of timing pulses further comprises:
   - a signal generator for generating said timing pulses;
   - means for counting said timing pulses;
   - a comparator for producing an output signal indicative of whether or not the count of said timing pulses is less than or equal to a predetermined reference quantity; and
   - means responsive to said comparator output signal for applying said timing pulses to said storage register as said series of control pulses when said count of said timing pulses is less than or equal to said reference quantity.

6. The apparatus of claim 5 wherein said means for periodically enabling said first source of timing signals further comprises:
   - a second source of timing pulses, said timing pulses produced by said second source having a frequency substantially lower than the frequency of said timing pulses produced by said first source; and
   - means responsive to each of said timing pulses produced by said second source of timing pulses for resetting said means for counting.

7. The apparatus of claim 3 wherein said means for generating a series of control pulses further comprises:
   - a source of relatively high frequency pulses;
   - means for counting said high frequency pulses;
   - means for comparing the count of said high frequency pulses to a predetermined reference quantity;
   - means for applying said high frequency pulses to said storage register as said series of control pulses when said count of said high frequency pulses bears a predetermined relationship to said reference quantity;
   - a source of relatively low frequency pulses; and
   - means responsive to each of said low frequency pulses for resetting said counting means.

8. The apparatus of claim 3 wherein said means for generating a series of control pulses further comprises:
   - a source of relatively high frequency timing pulses;
   - means for counting said high frequency timing pulses;
   - comparator means for producing an output signal indicative of whether or not the count of said high frequency timing pulses is less than or equal to a predetermined reference quantity;
   - means responsive to said output signal of said comparator means for applying said high frequency pulses to said storage register as said series of control pulses when said count of said high frequency pulses is less than or equal to said reference quantity;
   - a source of relatively low frequency pulses; and
   - means responsive to each of said low frequency pulses for resetting said counting means.

9. Apparatus for generating a logarithmically related series of digitally coded signal quantities comprising:
   - a first source of timing pulses;
   - means for periodically enabling said first source of timing pulses;
   - an accumulator for storing a digitally coded numerical quantity;
   - an adder for producing output signals representative of the sum of two digitally coded signal quantities applied thereto;
   - first means for applying said stored digitally coded signal quantity to said adder;
   - second means for applying said stored digitally coded signal quantity to said adder with numerical significance reduced relative to the numerical significance of said digitally coded signal quantity as applied to said adder by said first means; and
   - means for applying said output signals of said adder to said accumulator, said accumulator being arranged to store said sum represented by said adder output signals in response to a pulse from said first source of timing pulses.

10. The apparatus of claim 9 wherein said first source of timing pulses further comprises:

a signal generator for generating said timing pulses;

means for counting said timing pulses;

a comparator for producing an output signal indicative of whether or not the count of said timing pulses is less than or equal to a predetermined reference quantity; and means responsive to said comparator output signal for applying said timing pulses to said accumulator when said count of said timing pulses is less than or equal to said reference quantity.

11. The apparatus defined in claim 10 wherein said means for periodically enabling said first source of timing pulses further comprises:

a second source of timing pulses having frequency substantially lower than the frequency of the timing pulses produced by said first source of timing pulses; and means responsive to each of said timing pulses produced by said second source of timing pulses for resetting said means for counting.

12. Apparatus for generating a logarithmically related series of digitally coded signal quantities comprising:

a source of relatively low frequency timing pulses;

a source of relatively high frequency timing pulses responsive to said source of relatively low frequency timing pulses for producing a predetermined number of high frequency timing pulses in response to each of said low frequency timing pulses;

an accumulator for storing an applied digitally coded signal quantity in response to each of said high frequency timing pulses and for producing a digitally coded output signal representative of said stored quantity;

an adder for producing a digitally coded output signal representative of the sum of two applied digitally coded signal quantities;

means for applying said accumulator output signal to said adder;

means responsive to said accumulator output signal for producing a digitally coded output signal representative of said stored quantity reduced in significance by a predetermined numerical factor and for applying said digitally coded output signal to said adder; and means for applying said adder output signal to said accumulator.

13. The apparatus of claim 12 wherein said source of high frequency timing pulses further comprises:

a signal generator for generating said high frequency timing pulses;

a counter responsive to said signal generator for producing an output signal indicative of the number of said high frequency timing pulses that have been generated, said counter being reset by each of said low frequency timing pulses;

a comparator responsive to said counter output signal for producing an output signal indicative of whether or not said number of said high frequency timing pulses is less than or equal to a predetermined reference quantity; and means responsive to said comparator output signal for applying said high frequency timing pulses to said accumulator when said number of said high frequency timing pulses is less than or equal to said predetermined reference quantity.

14. Apparatus for generating a logarithmically related series of digitally coded signal quantities, said series starting with a predetermined initial quantity and ending when said generated signal quantities exceed a predetermined final quantity, comprising:

an accumulator for storing an applied digitally coded numerical quantity;

means for applying said predetermined initial quantity to said accumulator at the start of the operation of said apparatus;

a source of timing pulses;

means for periodically enabling said source of timing pulses;

an adder for producing output signals representative of said sum of two digitally coded signal quantities applied thereto;

first means for applying said stored digitally coded signal quantity to said adder;

second means for applying said stored digitally coded signal quantity to said adder with numerical significance reduced relative to the numerical significance of said digitally coded signal quantity as applied to said adder by said first means;

means for applying said output signals of said adder to said accumulator, said accumulator being arranged to store said sum represented by said adder output signals in response to a pulse from said source of timing pulses;

means for applying said timing pulses to said accumulator; and means responsive to said stored digitally coded signal quantity for disabling said means for periodically enabling when said stored quantity exceeds said predetermined final quantity.

* * * * *